United States Patent

Dunn, Jr.

[11] 4,389,391
[45] Jun. 21, 1983

[54] PROCESS FOR BENEFICIATING TITANIFEROUS ORES

[76] Inventor: Wendell E. Dunn, Jr., Star Rte. 68D, Lead, S. Dak. 57754

[21] Appl. No.: 278,322

[22] Filed: Jun. 28, 1981

[51] Int. Cl.³ .................... C01G 23/047; C22B 1/00
[52] U.S. Cl. .................... 423/610; 423/75; 423/79; 423/149; 423/613; 423/633; 75/1 TI
[58] Field of Search .................... 423/74, 76, 79, 149, 423/500, 633, 614, 610, 613; 75/1 TI

[56] References Cited

U.S. PATENT DOCUMENTS

| | | | |
|---|---|---|---|
| 2,657,976 | 11/1953 | Rowe | 423/74 |
| 3,105,736 | 10/1963 | Groves | 423/79 |
| 3,144,303 | 8/1964 | Engelmann | 423/79 |
| 3,865,920 | 2/1975 | Dunn | 423/74 |
| 3,925,057 | 12/1975 | Fukushima | 423/149 |
| 4,094,954 | 6/1978 | Bonsack | 423/149 |
| 4,174,381 | 11/1979 | Reeves | 423/633 |

Primary Examiner—Brian E. Hearn
Attorney, Agent, or Firm—Samuel V. Abramo

[57] ABSTRACT

An improved method of beneficiating ilmenite using two chlorinators in order to oxidize by-product iron chlorides to chlorine in the vapor phase and eliminate the necessity of separating the chlorine from combustion gas by cryogenic methods comprising using a first stage which produces beneficiated ore, and, inter alia, carbon dioxide, iron chlorides, predominantly ferrous chloride, which are condensed to gain the separation from $CO_2$; solid iron chlorides are fed to an oxidation zone in the void above the second stage beneficiator and reacted with oxygen; heat required for vaporization of the condensed chlorides is supplied in part by beneficiation within the second stage. The fluidized bed overflow of the second stage beneficiator is magnetically separated to separate practically pure $TiO_2$, useful as a starting material for $TiO_2$ pigment and a recycle stream of magnetic partially beneficiated ore.

8 Claims, 3 Drawing Figures

PROCESS FOR BENEFICIATING TITANIFEROUS ORES

FIELD OF THE INVENTION

This invention is a novel process for beneficiating a titaniferous ore.

BACKGROUND OF THE INVENTION

The beneficiation of titaniferous ores involving contacting the ore with chlorine in the presence of carbon yields vaporized iron chlorides and carbon dioxide as by-products. Due to anti-pollution laws, it is becoming exceedingly difficult to dispose of the by-product iron chlorides. Further, great economic incentives exist for a process in which the iron chloride is oxidized to chlorine and the chlorine then recycled to the process along with make-up chlorine if needed. However, prior to my invention such a process involved the oxidation of the mixture of iron chloride and carbon dioxide and the subsequent separation of the chlorine formed from carbon dioxide by cryogenic means which adds considerably to the cost of the process. The oxidation of iron chlorides is described in my patent U.S. Pat. No. 3,865,920 and other patents where vapor phase oxidation of beneficiator off-gases is described.

Another approach to iron chloride oxidation involves condensation of iron chlorides and re-volatilization followed by fluidized bed oxidation taught by J. I. Paige, et al., Jour. of Metals, 27 12 (November 1975) and by R. H. Sawyer U.S. Pat. No. 2,642,339. The condensation approach has the disadvantage of requiring not only condensing equipment but heat for re-volatilization and/or heat transfer equipment. Attempts to lower the temperature of ferric chloride oxidation to improve the reactor heat balance either with a catalyst as taught in U.S. Pat. No. 3,376,112 or extended retention time have not been commercialized even after several decades of labor in this field.

SUMMARY OF THE INVENTION

I have found that an economical process which eliminates the cryogenic step can be accomplished by utilizing two staged reactors both of which are used to beneficiate the titaniferous ores, using carbon and chlorine at elevated temperatures producing vaporized iron chlorides which are condensed. By-product carbon dioxide is vented from only one reactor while the condensed iron chlorides and the beneficiate from the first reactor are charged into a second reactor wherein ore beneficiation is completed. The condensed iron chlorides are vaporized in the void above the bed by the heat of the beneficiation and oxidation reactions and said vaporized iron chloride along with vaporous iron chlorides formed in the second beneficiator are oxidized to form chlorine and iron oxide. In my process the chlorine formed by the oxidation will contain the carbon dioxide formed in the second reactor. However, by my process chlorine-carbon dioxide mixture is recycled to the first reactor to provide a method of venting all the carbon dioxide formed, thus avoiding carbon dioxide build-up in the recycled chlorine.

My process provides a method for beneficiating a titaniferous ore into a product which is essentially pure titanium dioxide. The iron oxide moiety of the ore is converted first into iron chloride, preferably ferrous chloride, in the first reactor and then is oxidized into chlorine and iron oxide ($Fe_2O_3$) in the top of the second reactor. By-product carbon dioxide, diluent gases, and chlorine are separated by my process without using low temperatures or cryogenic means for condensing the chlorine and venting the other gases. My process efficiently utilizes the heat of reaction in the second reactor to vaporize ferrous and ferric chlorides from the first reactor.

This invention is directed to an improved process for beneficiating a finely divided titaniferous ore by chlorination under reducing conditions, e.g., in the presence of a carbonaceous material, fluidized at elevated temperatures, wherein the iron oxide portion of the ore is converted into gaseous iron chlorides and carbon dioxide, the improvement consisting of: (1) charging to a first reactor a bed of said ore mixed with 10-25% of particulate carbon, (2) with a gas selected from chlorine; chlorine and carbon dioxide; chlorine, air or oxygen and carbon dioxide; chlorine and nitrogen; chlorine, nitrogen and carbon dioxide; and chlorine, nitrogen, air or oxygen and carbon dioxide and contacting said bed with chlorine, at a temperature of 900° to 1100° C., and preferably 1000° to 1090° C. mixed with carbon to produce said partially beneficiated bed of ore and vaporized ferrous chloride and ferric chloride, (3) condensing said vaporized ferrous and ferric chlorides, separating therefrom carbon dioxide produced, (4) transferring a portion of said partially beneficiated bed to a second reactor to form a bed of a partially beneficiated ore and carbon into which is injected chlorine at a temperature of 900° to 1100° C. to further convert iron oxide in the partially beneficiated ore to iron chloride or a mixture of iron chloride, (5) charging the condensed ferrous chloride and ferric chloride to said second reactor above the bed in the gas space thereby vaporizing said ferrous and ferric chlorides which mix with the iron chloride vapors produced in the second reactor and (6) reacting the vaporized iron chlorides in the second reactor with oxygen to oxidize the iron chlorides to chlorine and iron oxide which are separated and withdrawing the beneficiated ore-carbon mixture from the second reactor and then separating by sieving and then passing over a magnetic separator or table. Recycle of magnetic partially beneficiated high iron ore fractions to the beds can be practiced.

DESCRIPTION OF THE PREFERRED EMBODIMENTS

Figure 1A:
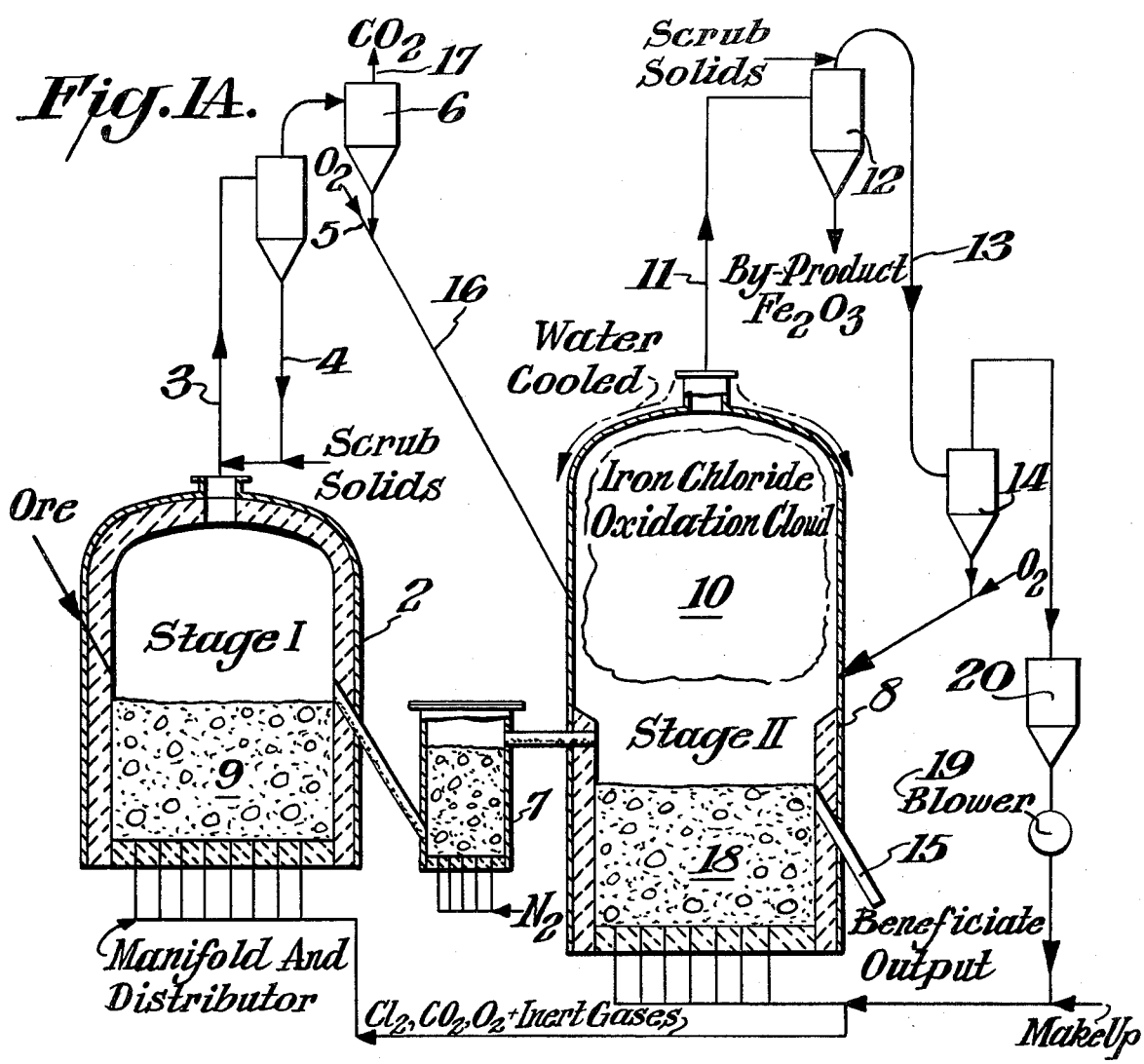
FIG. 1A is a schematic view illustrating the process equipment.
Figure 1B:
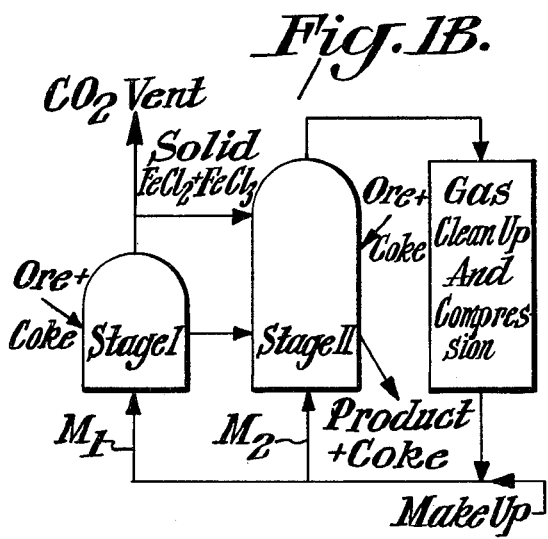
FIG. 1B is a flow diagram showing the raw materials input, the solids and gas output, and the gas flow to each reactor shown in FIG. 1A.
Figure 1C:
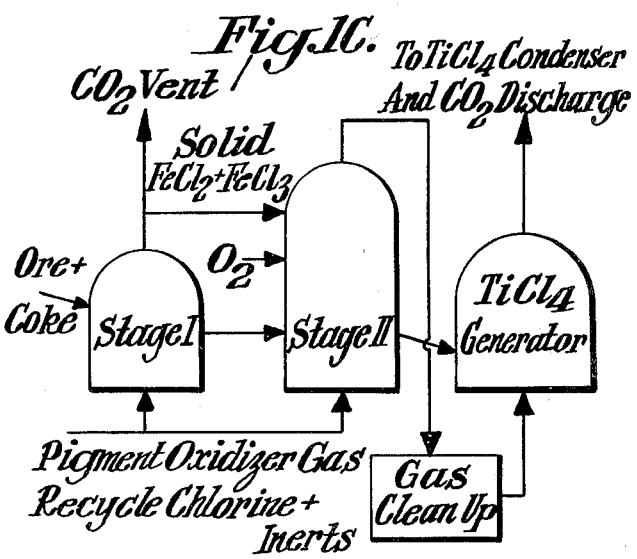
FIG. 1C is a modification of the flow diagram of FIG. 1B showing the incorporation of the process of this invention with the process of producing titanium tetrachloride in a third reactor.

The process as shown in FIGS. 1A, 1B and 1C consists of adding to the Stage I reactor 2 a mixture of titaniferous ore and coke to a fluidized bed 9 of said ore and coke. A mixture of chlorine gas mixed with recycled chlorine, carbon dioxide, oxygen and inert gases from the Stage II reactor is injected into said fluidized bed by a manifold and distributor located below said fluidized bed. Reaction gases consisting of predominately ferrous chloride, chlorine, oxygen, carbon dioxide and inert gases pass out of the Stage I reactor to a scrubbed flue 3 into which scrubbing solids are passed and wherein solid ferrous chloride condenses. The solid ferrous chloride, which is in a finely divided form, gaseous ferric chloride and other gases are separated from the scrubbing solids in a cyclone 5 and are passed to a condensing cyclone 6 wherein carbon dioxide, oxygen and inert gases separated and removed by line 17 and any ferric chloride is condensed to form with the ferrous chloride a mixture of iron chlorides, which is fed to the Stage II reactor by line 16. The condensing of ferrous chloride from the Stage I reactor takes place in the scrubbed flue 3 to prevent the adherence of iron chlorides from the surface of the line by movement in the line. The scrubbing solids are separated and recycled by line 4, the iron chlorides passed on to the oxidation cloud 10 formed by the reaction of iron chlorides and oxygen injected into Stage II in reactor 8. The beneficiate and partly beneficiated ilmenite flows through a "transfer leg" 7 into the second stage reactor 8.

The "cloud" 10 is the site of the iron chloride oxidation and the partially oxidized mixture is cooled to a temperature above the $FeCl_3$ dewpoint and the oxides and higher melting chlorides separated in cyclone 12. The gases pass into a scrubbed second flue 11 which cools well below the condensation point of $FeCl_3$. The iron chloride condensing flue is also scrubbed with recycle or fresh ilmenite which is transported by recycle chlorine 16 with the $FeCl_3$ into the cloud 10. Fresh ore and coke may also be added to reactor 2 if desired.

The gas from cyclone 12, consisting of $CO_2$, $Cl_2$, $O_2$ and inerts is cleaned, pressurized and recycled to the reactors along with make up $Cl_2$.

FIG. 1B is a simplified flow diagram showing the gas flows to each reactor and the $CO_2$ exit stream. Mixing simplifying assumptions as a first approximation which will show the concentrations of gas streams for various reactor size ratios we set:

$X$ = mol ratio of $Cl_2$ in beneficiator feed gas
$\beta$ = mols $CO_2$ made/mol $Cl_2$ in reactor II (This will be nearly the same for Stage I if the reactors are operated at the same iron level).

$$\gamma = \frac{M_1}{M_2} \text{ or } \frac{\text{mols chlorine to reactor 1}}{\text{mols chlorine to reactor 2}}$$

The concentration ratio of gas off reactor II is $$X = \frac{\text{mols } Cl_2}{\text{mols } CO_2 + \text{inerts}} = \frac{M_1 + M_2}{\frac{M_2}{X} + \beta M_2} =$$

$$\frac{M_2 + M_2}{\left(\frac{1}{X} + \beta\right) M_2} = \frac{\gamma + 1}{\frac{1}{X} + \beta}$$

Let inert gases = 0, then $$X = \frac{(\gamma + 1)}{\left(\frac{1}{X} + \beta\right)}$$

$1 + \beta X = \gamma + 1;$ and, therefore $\gamma = \beta X$

The chlorine concentration will be:

mols $Cl_2$/mols $Cl_2$ + mols $CO_2$ + inerts.

Since $$X = \frac{\text{mols } Cl_2}{\text{mols } CO_2 + \text{inerts}}$$

$$\frac{1}{X} = \frac{\text{mols } CO_2 + \text{inerts}}{\text{mols } Cl_2}$$

$$1 + \frac{1}{X} = 1 + \frac{\text{mols } CO_2 + \text{inerts}}{Cl_2} =$$

$$\frac{\text{mols } Cl_2 + \text{mols } CO + \text{inerts}}{Cl_2}$$

and the mol fraction of $Cl_2$ will be $X/(X+1)$ substituting $\gamma = \beta X$ we have $$\frac{\frac{\gamma}{\beta}}{\frac{\gamma + 1}{\beta}} = \frac{\frac{\gamma}{\beta}}{\frac{\gamma + \beta}{\beta}} = \frac{\gamma}{\gamma + \beta}$$

$\beta$ will range from $\frac{1}{2}$ to $\frac{3}{4}$ depending on the state of ore oxidation and the $FeCl_2/FeCl_3$ mol ratio. The following equations govern the stoichiometry of beneficiation:

| | $CO_2/Cl_2$ |
|---|---|
| $FeO + \frac{1}{2}C + Cl_2$ yield after oxidation $\frac{1}{2}CO_2$ and $Cl_2$ | .5 |
| $\frac{1}{2}Fe_2O_3 + \frac{3}{4}C + 1\frac{1}{2}Cl_2$ yield after oxidation $\frac{3}{4}CO_2$ and $1\frac{1}{2}Cl_2$ | .5 |
| $\frac{1}{2}Fe_2O_3 + \frac{3}{4}C + Cl_2$ yield after oxidation $\frac{3}{4}CO_2$ and $1Cl_2$ | .75 |

I have found that beneficiators operating at significant iron levels produce substantially all $CO_2$. These $CO_2/Cl_2$ ratios have been experimentally verified at pilot plant scale, the values for low iron levels closely approximating 0.75. Of course added oxygen fed into the bed for heat balance purposes increased the ratio as would be expected.

For the case of equal sized reactors where $\gamma = 1$
$^CCl_2 = 1/(1 + \beta)$ which is 57% $Cl_2$ input for all ferrous chloride production from an oxidized ore.

One can see that increasing the size of the first reactor will increase $\gamma$ and rapidly increase the $Cl_2$ concentration. Heat balance considerations will limit the value of $\gamma$ to about 3. The chlorine concentration in such a system would be 80% for ferrous chloride production from an oxidized ore, with negligible inert gas. Inert gas can be nitrogen which is mixed with the chlorine for proper heat balance and fluidizing flow rate or the gas used to fluidize the "transfer leg" between the two reactors.

By variation in the reactor size and fluidization velocities the chlorine concentration may be increased as the second reactor area is reduced. There is a limitation imposed by the cloud heat balance which becomes more nearly adiabatic as the reactor size is increased. Furthermore, the stabilizing influence of the fluidized bed operating at temperatures above or near the cloud temperature must not be diminished to an unstable point. A cloud temperature above 750° C. represents a stable condition. The increased temperature above this point allowing feed variations to the cloud without a temperature decrease below the reaction point.

From the above, it is apparent that the process is well adapted for both continuous and bath type processes. Both reactors used in the process can be refractory lined steel reactors. In the first reactor the coke titaniferous ore mixture rests on a distribution plate through which 100% chlorine and a mixture of chlorine and diluent gases such as carbon dioxide and nitrogen are directed upward through the ore-carbon mixture, at a flow rate of chlorine or chlorine mixed with diluent gas sufficient to fluidize the ore-carbon bed.

The rate of flow of chlorine or chlorine-diluent gas mixture can conveniently be 0.5 ft/sec. The bed depth in the first reactor can be 0.5 to 4 feet (static); however, beds of 6 feet or more can be used. The ore which is finely divided preferably, 40 mesh to 200 mesh is mixed with 20% by weight of $-10$ mesh carbon preferably of the petroleum coke type. The mixture of ore-carbon can be dried or dried and preoxidized by passing air or oxygen through the ore-carbon mixture at a temperature maintained at about 600° to 900° C. The drying or drying-preoxidization requires about 0.1 to 1.0 hours to complete.

The ferrous chloride can be condensed by using a condenser, for example, a condenser similar to that described in U.S. Pat. No. 3,683,590. The ferrous chloride condenses as a liquid permitting the by-product carbon dioxide to be vented. Diluent gases, when used are also vented along with the carbon dioxide. Alternatively, the iron chlorides may be condensed to solids and recycled to the second beneficiation stage where they are revaporized and oxidized. Separation of scrubbing solid and condensed iron chlorides is effected before solids recycle. Separation of chlorides and the scrubbing solids can be easily effected by elutriation since iron chlorides are small flaky particles compared to ore and beneficiate.

The second reactor is essentially the same as the first reactor except that it may differ in height and cross-sectional area; the void space above the fluidized bed is larger and this gas reaction space is equipped with oxygen inlet ports designed to permit oxygen to be injected into this void above the fluidized bed. Both are water-cooled mild steel shells with a refractory distributor and lining in the fluidized bed zone.

The ore-carbon mixture from the first reactor is transferred to the second reactor by means of a transfer leg, where chlorine mixed with carbon dioxide, excess oxygen and nitrogen is introduced at a rate sufficient to fluidize the ore-coke mixture. Solid transfer devices of this type are described in my application, Ser. No. 893,613, filed Apr. 5, 1978, now abandoned.

The condensed iron chlorides from the first reactor are also transferred through line 16 to the second reactor gas space where they revaporize and mix with vaporized iron chloride of the second beneficiator produced by the reaction of chlorine with the iron oxide remaining in the ore in the presence of carbon.

Oxygen is injected into the vaporized iron chloride mixture in the second reactor at a point sufficiently high enough above the bed to avoid contact with carbon of the fluidized bed. In essence, the second reactor is a two-zoned reactor wherein in the bottom zone the beneficiation of ore and the partially beneficiated ore from the first reactor is completed and in the upper or second zone the iron chloride is oxidized to chlorine and iron oxide.

The ore-coke mixture in the first reactor is continuously removed from the reactor and introduced into the second reactor, maintaining a 3' static bed depth. Chlorine is passed through the bed at a rate sufficient to fluidize the bed (about 0.5 ft/sec.) and produce a second partially beneficiated bed of ore which was continuously withdrawn. The average residence time in the second reactor is about 45 minutes. The withdrawn ore is quickly cooled under non-oxidizing conditions using air and water and screened to remove unreacted coke and then passed over a magnetic separator which separates the ore into a product fraction containing about 98%, by weight, of titanium dioxide and about 0.7%, by weight, of iron oxide (calculated as iron) and a second fraction containing about 12%, by weight, of iron oxide (calculated as iron). The second fraction has a composition of about 85%, by weight, of titanium dioxide. The unreacted coke is recycled to the preheater. Part of the second reactor's magnetic fraction can be recycled to the first reactor with fresh ore-coke from the preheater.

Thorough mixing of the oxygen and iron chloride vapors in the second reactor occurs by convection currents within the mixture. The reaction of oxygen and the vaporized iron chloride produces a cloud of chlorine, carbon dioxide, iron oxide, ferric chloride, ferrous chloride and iron oxide nuclei having a temperature which varies from 800°–1200° C. The cloud mixture retention time should be about 80 seconds in the void above the bed in the second reactor. The cloud gases then pass through a 4" stainless steel water cooled pipe of variable water cooled length to reduce the gas-solid mixture to a temperature between 250° and 400° C. before it is passed to the iron oxide cyclone which separates the gaseous chlorine, unreacted oxygen, carbon dioxide, ferric chloride and traces of sulfur dioxide from the solid iron oxide, high boiling metal chlorides, dust and traces of titanium dioxide. The remaining gases are passed through the 5" 160' heat exchanger with scrubbing solids and exited to the ferric chloride cyclone at 50° C. The gases then pass through the cyclone which separates the gaseous chlorine, oxygen and carbon dioxide from the scrubbing solids and condensed ferric chloride. The scrubbing solids medium can be an ore mixture obtained from the first reactor or fresh ore. The ferric chloride will evaporate in the second reactor cloud and the scrubbing solids then fall into the fluidized bed to be further beneficiated described above.

The reaction of iron chlorides in the zone above the ore-carbon bed has been described in my U.S. Pat. No. 3,865,920. The iron oxide chlorine mixture which may attain a temperature as high as 1200° C. or higher is exited to a heat transfer flue and is cooled to a temperature above 300° C. and thereafter the iron oxide is separated from the chlorine by means of cyclone 12. At this point, the chlorine will contain volatilized ferric chloride which is condensed from the gaseous chlorine containing stream by cooling in 13. The separated ferric chloride is recycled to the second reactor where it is revolatilized and subjected to oxygen as above. It may be combined with iron chlorides from the first stage beneficiator for ease of introduction.

Traces of ferric and ferrous chlorides may be removed from the chloride by means of a condenser 20 prior to the chlorine being recycled to the reactors by means of blower 19.

The ore-bed mixture in the second reactor is removed by means of an outlet tube 15 and cooled. The carbon is removed from the mixture by sieving or air tabling. The ore is then passed over a separator which separates particles containing greater than about 1%, by weight, iron. The product obtained is essentially titanium dioxide containing 1.0%, by weight, iron or less. The separator can be adjusted to produce a product containing higher amounts of iron such as up to 2%, up to 3%, up to 4% or up to 5%, by weight, if desired. The separator can be a magnetic separator commonly used in mining operations or a separator which separates by density.

As an alternative to magnetic separation or other separation of partially beneficiated ore from the completely beneficiated ore, it is possible to use a "peanut" reactor as described in my co-pending application filed even date herewith.

Use of a third stage with product gases passing into the cloud for chlorine recovery will allow single pass solids throughput of the ore without excessive $TiCl_4$ loss to obtain a high grade beneficiate.

The product of this invention is useful as a starting material for the production of titanium dioxide replacing rutile in such use.

The invention is further exemplified by the following:

EXAMPLE

Equipment

PREHEATER:

The preheater is a gas-solids reactor constructed of steel having a refractory distributor upon which is placed a mixture of titaniferous ore and carbon. The internal diameter of the reactor is 5.5 feet and the height 6.0 feet. The preheater is equipped with an outlet port, a plenum chamber located below the distribution plate to which is supplied a source of air and oxygen and a gas outlet port located at the top of the preheater. The preheater wall is lined with ceramic brick the top with castable refractory.

FIRST BENEFICIATOR:

The first reactor is a gas-solids steel reactor having a diameter of 5.5 feet and a height of 6.0 feet which is partially lined with ceramic bricks and equipped with a distribution plate, a plenum chamber, solids outlet port, a solids inlet port connected to the preheater outlet port by way of a transfer leg and a condenser located on top of the reactor. The plenum chamber is equipped with a source of oxygen, air, chlorine or recycle chlorine and inert diluent gas which can be nitrogen or carbon dioxide.

SECOND BENEFICIATOR:

A refractory lined gas-solids steel reactor having a diameter of 5.5 feet and a height of 16.0 feet. The reactor is equipped with a source of oxygen, air, chlorine or recycle chlorine and diluent gas, a solid outlet, an injection port tangentially located midway between the distribution plate and the top of the reactor, and an outlet port located at the top of the reactor to which is connected a 4" stainless steel single pipe heat exchanger, a "flue." Oxygen is supplied to the injection port located approximately 8 feet above the distributor. Dried ilmenite scrubbing solids mixed with iron chloride from the first reactor are introduced into the second reactor through the injection port. Fluidized bed material is continuously removed from the reactor by overflow through an outlet port located at the reactor wall leading to a fluidized cooler where the ore is cooled to about 250° C. and flows out of the cooler.

HEAT EXCHANGERS:

(1) The iron chloride condenser from the first beneficiator consists of a 4" stainless steel pipe 150' long, water cooled. It is connected to a cyclone to separate solids from the waste gas which is vented. Scrubbing solids are added to the entrance.

(2) The oxidation flue is also a 4" water cooled stainless steel pipe which removes heat from the gas-solids mixture issuing from the second beneficiator top. About 60' is needed to cool the gases to 300° C., the water cooled length can be varied to hold the exit gas temperature within the limits of 250°–400° C.

(3) The iron chloride condensing flue is a vertically disposed 150' total length of 5" diameter thin wall stainless steel water-cooled. The first leg rises 40' above the cyclone and gives sufficient temperature drop to bring the gas temperature below 180° C. This gives a straight run for the scrubbing solids which are added at a rate of 10 lbs. per minute to scrub and keep the walls clean of condensed chlorides.

CYCLONES:

The cyclones to collect the solids are conventional cyclones of 18" diameter.

TRANSFER LEGS:

The transfer legs between the preheater and the beneficiator, not shown, are refractory lined as is the transfer leg 7. These are water cooled on the exterior, 12" inside diameter with bare tops. The linings are castable refractory with a 60° cone bottom.

Generally, no gas clean-up or pressurization is needed.

OPERATION

The fresh ore is fed to a preheater, not shown, where the fine coke and ilmenite dust are removed by fluidization velocities above that of the following beneficiation Stages I and II. In the course of preheating, the ilmenite is oxidized at temperatures of the order of 800°–950° C. The oxidation takes place in the presence of carbon in the preheater. The amount of coke burned in the preheating is about 25–40% of the coke originally fed. The mixture leaving the preheater is 20% coke by weight. The preheater ore feed may also include partially beneficiated magnetic separated materials in the preheater.

The first beneficiator is heated and held at a temperature of 1050° C. Chlorine gas is passed through the ore-coke bed (having a static bed depth of 3 feet) to fluidize the ore-coke mixture. The flow rate of the chlorine is 0.5 ft/sec. The chlorine is mixed with oxygen, air or nitrogen to hold temperature constant. The iron chlorides, formed by the reaction of chlorine with the ore-coke mixture consist predominately of ferrous chloride which is in the form of a vapor mixed with vaporized ferric chloride, carbon dioxide, traces of titanium tetrachloride, carbon monoxide, vaporized chlorides of manganese, magnesium and the other trace metal oxides present in the ilmenite. About 1 to 2 lbs./min. of dust consisting of finely divided carbon, ilmenite, titanium dioxide and silicates also will blow over with the gases. The iron oxide content of the ore-coke mixture in the first reactor is maintained below 4% iron, by weight, by adjustment of the feed from the preheater and the scrubbing solids to the iron chloride condenser.

The vapors from the first reactor are passed through the condenser which separates gaseous carbon dioxide and inerts from the mixture of iron chlorides. The noncondensible gases are vented to the atmosphere. The condensed iron chlorides are collected and introduced along with a ferric chloride by-product stream from the second stage ferric chloride condensing heat exchanger into the second reactor which also operates at a temperature of 1050° C. At a point approximately 8.0 feet above the distributor the Stage I iron chlorides vaporize and mix with the gaseous iron chlorides rising from the reaction with the second beneficiator. The vaporized iron chloride cloud at a temperature of about 810° C. reacts with oxygen supplied in excess of the amount necessary to oxidize the iron chloride to chlorine and iron oxide.

The ore-coke mixture in the first reactor continuously overflows and is introduced into the second reactor, maintaining a 3' static bed depth.

Chlorine is passed through the second beneficiator bed at a rate sufficient to fluidize it (about 0.5 ft/sec.) and produce a second partially beneficiated bed of ore which is continuously withdrawn. The average residence time in the second reactor is about 45 minutes. The withdrawn ore is quickly cooled under non-oxidizing conditions using air and water and was screened to remove unreacted coke and is passed over a magnetic separator which separates the ore into a product fraction containing about 98%, by weight, titanium dioxide and about 0.7%, by weight, of iron oxide (calculated as iron) and a second fraction containing about 12%, by weight, of iron oxide (calculated as iron). The second fraction had a composition of about 85%, by weight, of titanium dioxide. The unreacted coke was recycled to the preheater. Part of the second ore magnetic fraction was recycled to the first reactor with fresh ore-coke from the preheater.

Thorough mixing of the oxygen and iron chloride vapors in the second reactor occurs by convection currents within the mixture. The reaction of oxygen and the vaporized iron chloride produce a cloud of chlorine, carbon dioxide, iron oxide, ferric chloride, ferrous chloride and iron oxide nuclei having a temperature which varies from 800°–1000° C. depending principally on the ferrous/ferric ratio of the chlorides. The cloud mixture had a retention time of about 80 seconds in the void above the bed in the second reactor. The cloud gases pass through the 4" stainless steel water cooled pipe with water cooled length varied to hold the gas-solid mixture exit temperature between 250° and 400° C. before it passes to the iron oxide cyclone which separates the gaseous chlorine, unreacted oxygen, carbon dioxide, ferric chloride and traces of sulphur dioxide from the solid iron oxide, metal chlorides, dust and traces of titanium dioxide. The remaining gases which pass through the 5" heat exchanger with scrubbing solids exit to the ferric chloride cyclone at 50° C. The second cyclone separated the gaseous chlorine, oxygen and carbon dioxide from the scrubbing solids and condensed ferric chloride for recycle. The solid scrubbing medium used was the cooled coke free ore obtained from the preheater where it was dried removing absorbed water and hydroxyls.

The use of process heat generated in the second stage cloud oxidation determines the amount of iron chloride that can be accepted from the preceding stage. Since the heat generated by ferrous chloride oxidation exceeds that of ferric chloride oxidation, one seeks production of ferrous chloride in the first beneficiator. In addition to this advantage ferrous chloride condenses at a higher temperature than ferric giving a marked heat transfer surface advantage.

Similarly, the cloud temperature of ferrous chloride oxidation cloud is higher than a ferric chloride oxidation cloud—excessively so. Hence the lowering of the cloud temperature by solid iron chloride volatilization is advantageous. By operating both reactors in the ferrous chloride production region the best concentration of chloride can be obtained with the second reactor carrying a less beneficiation load.

By variation of gas velocity and iron concentrations in the bed, operating points within the suitable cloud temperature ranges can be selected and beneficiator capacity optimized.

A wide range of beneficiator off-gas iron chloride ratio is possible within a narrow bed iron concentration variation so that cloud temperature control can be affected by control of fluidized bed iron concentrations.

The present invention may also be applied to systems which are integrated with chlorination pigment production processes. In that application of the invention the beneficiate which is produced flows directly from the beneficiator unit to the chlorinator without having carbon separated. The cooling may be to any desired temperature for heat balance with the $TiCl_4$ generator.

The advantages of employing this double beneficiator system is that it may be used to increase the concentration of the gases flowing from the pigment oxidizer.

By introducing pigment oxidizer gases to the two beneficiation stages and taking the output gases from the iron chloride oxidizer and passing them to the pigment plant $TiCl_4$ generator, it is possible to increase the chlorine concentration over that of the returning gas from the oxidizer in cases where air was admixed with oxygen in the pigment oxidizer giving a nitrogen concentration in the recycled chlorine. By increasing this concentration it is possible to increase the capacity of the $TiCl_4$ system as well as beneficiating ilmenite for its feed stream. FIG. 1C shows a simplified sketch of the above process configuration.

I claim:

1. In a process for beneficiation of titaniferous ore by chlorination under fluidizing and reducing conditions in the presence of a carbonaceous material at elevated temperatures comprising converting the iron oxide portion of the ore to vaporized iron chloride or a mixture of vaporized iron chlorides and producing carbon dioxide and producing thereby a product comprising essentially polycrystalline rutile:

the improvement consisting of:

(a) chlorinating the ore in a first reactor to form a partially beneficiated ore-carbon mixture and a gaseous by-product comprising carbon dioxide, traces of carbon monoxide, iron chlorides and diluent gases;

(b) condensing the iron chloride in the gaseous by-product and exiting the said carbon dioxide, traces of carbon monoxide, and diluent gases in said gaseous by-product;

(c) passing the condensed iron chlorides and partially beneficiated ore carbon mixture to a second reactor;

(d) subjecting the partially beneficiated ore-carbon mixture to chlorine and at elevated temperatures to further beneficiate said ore forming vaporized iron chloride and vaporizing iron chlorides introduced from the first reactor exiting said further beneficiated ore from the second reactor and thereafter cooling and separating the product from unreacted carbon; and (e) subjecting the vaporized iron chloride or mixture of iron chlorides and the carbon dioxide to oxygen to oxidize the iron chlorides to chlorine and iron oxide.

2. The process of claim 1 wherein a portion of the ore of the first reactor is introduced into the second reactor whereby the ore is further beneficiated into substantially pure titanium dioxide and the iron chloride or mixture of iron chlorides produced thereby is vaporized and oxidized along with the iron chlorides from the first reactor.

3. The process of claim 1 comprising subjecting the ore in a first and second fluidized bed reactor to chlorine, continuously condensing the iron chloride or mixture of iron chlorides from the first reactor, continuously exiting the carbon dioxide from the first reactor, continuously passing the condensed iron chloride or mixture of iron chlorides to the second reactor, vaporizing said condensed iron chlorides and continuously subjecting said vaporized iron chlorides or mixture of iron chlorides in the second reactor to oxygen to oxidize the iron chlorides or mixture of iron chlorides to chlorine and iron oxide mixed with carbon dioxide produced in the second reactor.

4. The process of claim 1 wherein the temperature in the reactors are in the range of 900° to 1100° C., the titaniferous ore is mixed with 10 to 30 percent, by weight, of carbon and the vaporized iron chloride or mixture of iron chlorides is oxidized in the range of 800° to 1000° C.

5. The process of claim 1 wherein the titaniferous ore is subjected to oxidation roasting at a temperature of above 600° C. prior to passing to the first and second reactor.

6. The process of claim 1 comprising transferring the ore-coke product from Stage II to a third reactor, to form a bed which is contacted, at elevated temperature with recycled chlorine from iron chloride oxidization to form a mixture of $TiCl_4$ and minor amounts of iron chloride and other chlorides separating $TiCl_4$ from the mixture venting carbon dioxide and inert gas oxidizing with the $TiCl_4$ to form $TiO_2$ pigment and chlorine mixed with nitrogen and transferring to chlorine mixed with nitrogen to the first and second reactors.

7. The process of claim 6 wherein iron chloride from the third reactor is ejected into the second reactor for vaporization and oxidation.

8. The process of claim 1 comprising transferring the ore-coke product from the second reactor to a third reactor to form a bed which is contacted at elevated temperatures with recycle chlorine from iron chloride oxidation to form a mixture of $TiCl_4$ and minor amounts of iron chloride and other metal chlorides and separating the $TiCl_4$ therefrom.

* * * * *